Nov. 12, 1929.  P. J. KILCULLEN  1,735,203
SPEED CHANGING DEVICE
Filed Feb. 14, 1928   4 Sheets-Sheet 2

WITNESSES:

INVENTOR
Patrick J. Kilcullen,
BY
ATTORNEY

Nov. 12, 1929.    P. J. KILCULLEN    1,735,203
SPEED CHANGING DEVICE
Filed Feb. 14, 1928    4 Sheets-Sheet 4

WITNESSES:

INVENTOR
Patrick J. Kilcullen,
BY
ATTORNEY

Patented Nov. 12, 1929

1,735,203

UNITED STATES PATENT OFFICE

PATRICK J. KILCULLEN, OF PHILADELPHIA, PENNSYLVANIA

SPEED-CHANGING DEVICE

Application filed February 14, 1928. Serial No. 254,265.

My invention relates to speed changing devices and more particularly to a device for automatically changing the speed of a driven shaft relatively to the speed of the driving shaft.

In starting a load on many machines, particularly where power is supplied by internal combustion engines, it is necessary to rotate the driven shaft at a much lower rate of speed than is desired when the machine is in full operation. The necessary speed changes are usually accomplished by shifting gears, friction disks or belts from larger to smaller gears, disks or pulleys and gradually increasing the speed of the machine through successive shifts. These operations must be manually performed and require some skill on the part of the operator in order to avoid danger of accident to the machine or to the source of power for driving such machine.

Objects of this invention are to provide a device for automatically increasing the speed of a machine from its starting to its running speed, which is fully automatic and positive in its operation and which is adapted for use on almost any kind of machine requiring to be started at a speed substantially below that at which it normally operates.

Figure 1:
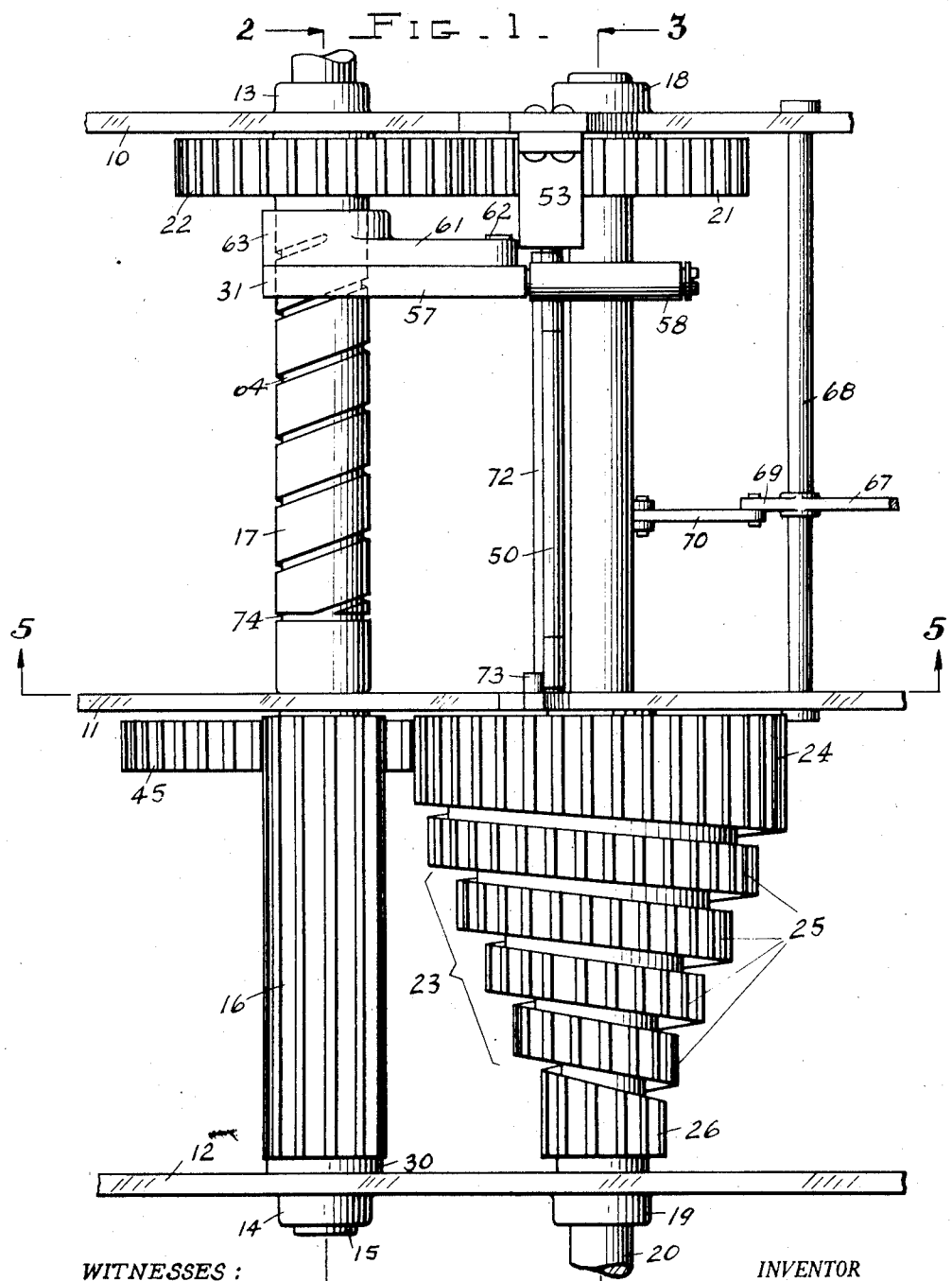
Figure 2:
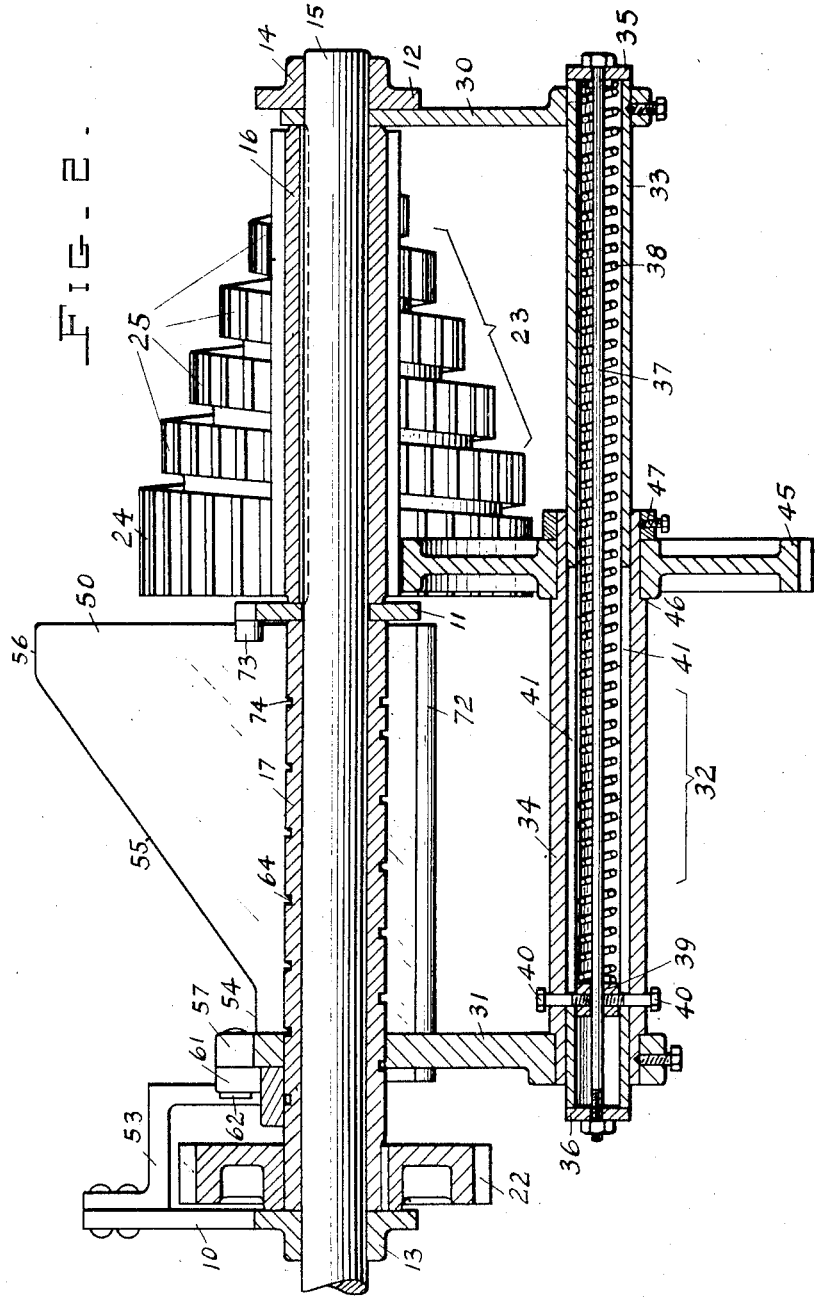
Figure 3:
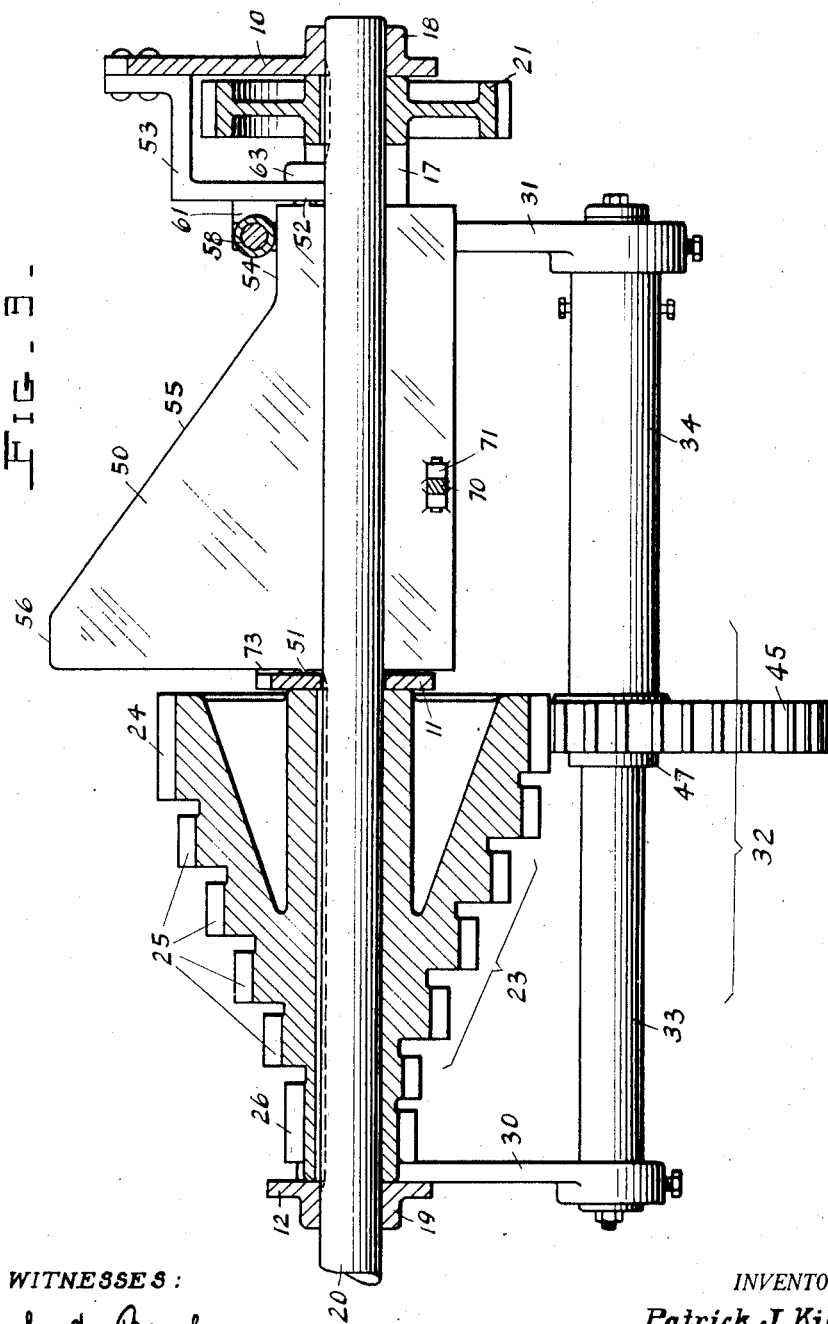
Figure 4:
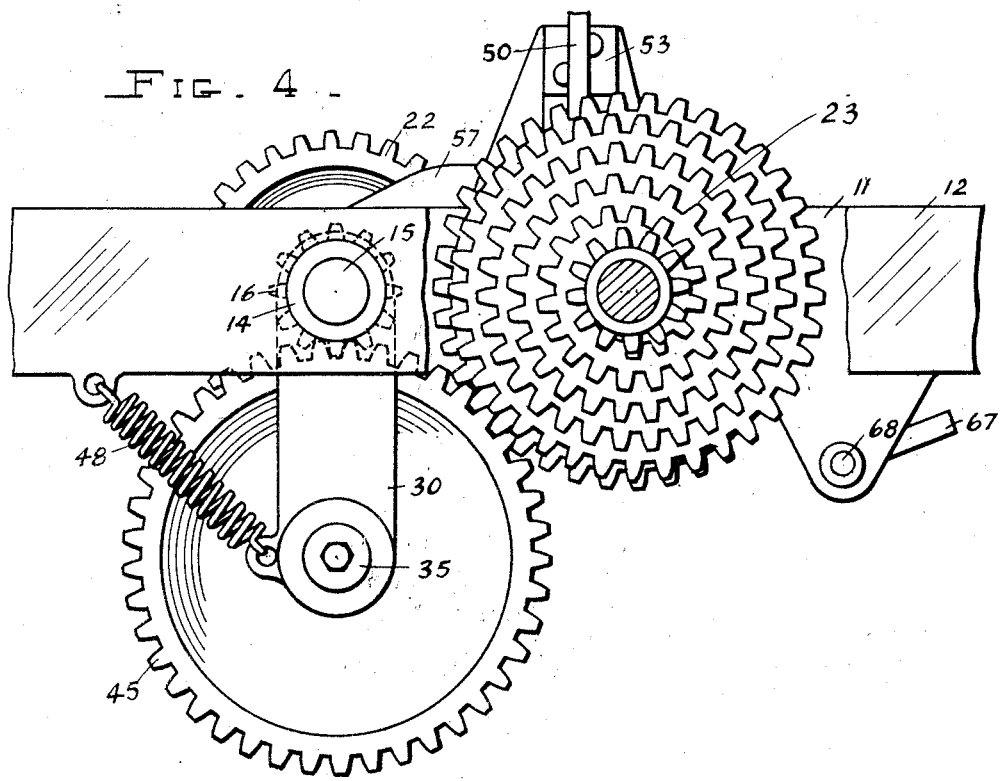
Figure 5:
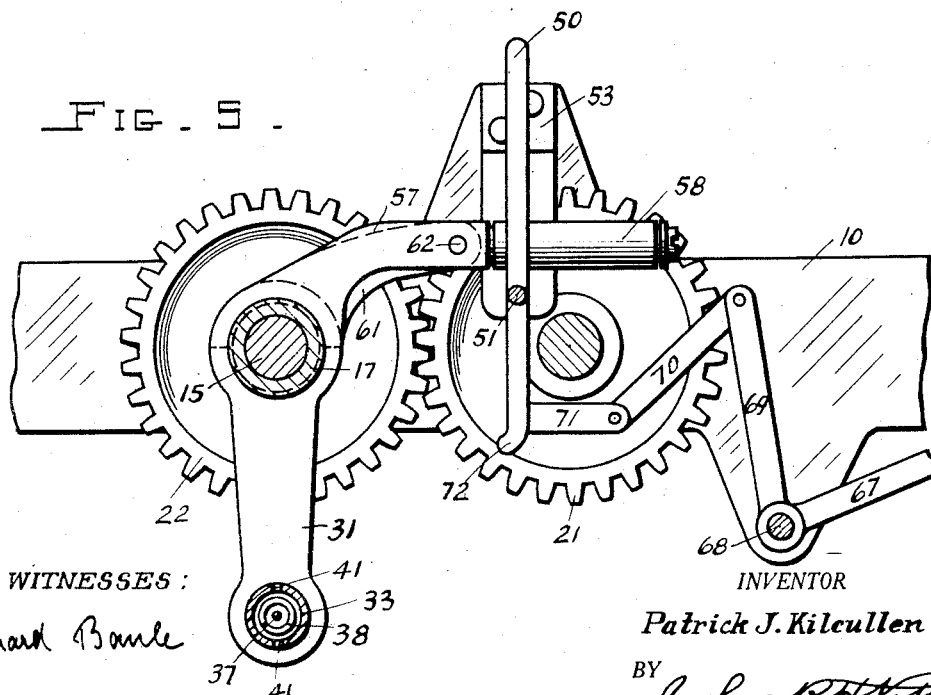

An embodiment of the invention is illustrated in the accompanying drawings in which Figure 1 is a top plan view of a speed changing device embodying my invention, Figure 2 a longitudinal sectional view, taken on line 2—2 on Figure 1, Figure 3 a longitudinal sectional view, taken on line 3—3 on Figure 1, Figure 4 an end view, looking from the front of Figure 1 but having certain parts broken away, and Figure 5 a transverse sectional view taken on line 5—5 on Figure 1.

Briefly, the invention resides in placing a helical gear and a spur gear in spaced relation to one another and providing an idler gear which meshes with the spur gear and is adapted to be brought into mesh with the idler gear and to feed or be fed along the helical gear so as to incease or decrease the speed thereof relatively to the speed of the spur gear. The helical gear may be either the driving or driven element but, for the sake of illustration, it will be described as being the driven element and the idler gear adapted to be fed from the largest to the smallest part of the helical. The spur gear may be adapted to feed along a shaft and remain in mesh with the idler gear or may consist of an elongated gear of substantially the same length as the helical gear so that the idler gear may feed longitudinally of both gears.

The idler gear should be out of mesh with the spur gear when the machine is idle and arrangements are made for swinging it into engagement with the helical gear when the machine is started and for feeding it along the helical gear to increase the speed of the machine. A number of arrangements may be made for swinging the idler gear into mesh with the spur gear and for feeding it therealong, and it is to be understood that the arrangement described hereinafter is illustrative only and that any equivalent means may be substituted without departing from the scope of the invention.

For a more detailed description of the embodiment illustrated, reference may now be had to the accompanying drawings which show the device mounted in a suitable frame of which only frame members 10, 11 and 12 are shown. Frame member 10 is provided with a bearing 13 and frame member 12 with a bearing 14 in which a driving shaft 15 is rotatably mounted. An elongated driving gear 16 is fixed on shaft 15 between frame members 11 and 12 and a threaded sleeve 17 is rotatably mounted on shaft 15 between frame members 10 and 11.

Frame members 10 and 12 are provided respectively with bearings 18 and 19, in which a driven shaft 20 is rotatably mounted and provided, adjacent frame member 10, with a spur gear 21 which meshes with a similar spur gear 22 fixed on the end of sleeve 17 so that this sleeve will be rotated whenever the driven shaft 20 is rotated.

A helical gear 23 of substantially frustoconical contour is fixed on shaft 20 between frame members 11 and 12 and is preferably provided with a concentric portion 24 at its greatest diameter so that a gear meshing therewith will make at least one complete turn, around the largest diameter of the spiral before it starts to feed along the helical portion 25 to the smaller end of the gear which consists of a concentric portion 26 of smaller diameter than the portion 24 or of any part of the helical portion and with which a gear may remain in mesh while the gear 23 is at its greatest speed.

A hanger 30 is rotatably supported on shaft 15 between the end of gear 16 and frame member 12 and a hanger 31 is rotatably mounted on sleeve 17 and adapted to be moved therealong, as will hereinafter be described. An idler shaft 32 is carried in the lower ends of hangers 30 and 31 and consists of a hollow shaft 33 having one end fixed in the lower end of hanger 30 and its other end extending through a quill 34 which has its end fixed in the lower end of hanger 31.

The ends of hollow shaft 33 are closed by caps 35 and 36 held in place by a rod 37 extending through the center of shaft 33. A helically coiled spring 38 encircles rod 37 and has one end abutting cap 35 and its other end abutting a collar 39 slidably mounted on rod 37 and held against movement relatively to quill 34 by bolts 40 extending through the quill and threaded into collar 39; bolts 40 extending through slots 41 formed in the walls of hollow shaft 33 so that quill 34 may move longitudinally on hollow shaft 33.

An idler gear 45 is rotatably mounted on quill 34 and held against longitudinal movement relatively thereto by a shoulder 46 formed on the quill and a collar 47 removably secured on the end of the quill. Idler gear 45 meshes with gear 16 at all times but is out of mesh with spiral gear 23 when the device is not in operation and, in order that it may not accidentally come into mesh therewith at such time, it is yieldingly held against movement in that direction in any suitable manner, as by means of a spring 48 having one of its ends secured to hanger 30 and its other end secured to frame member 12, as shown in Figure 4.

The idler shaft 32 may be swung to bring idler gear 45 into mesh with helical gear 23 by any suitable means shown, this is accomplished by providing the shaft 32 with a support 50 rockably mounted on trunnions 51 and 52 formed on its ends and rockably mounted, respectively, in frame member 11 and in a bracket 53 fixed to frame member 10. Support 50 has a straight portion 54 corresponding to concentric portion 24 on gear 23, an inclined portion 55 corresponding to helical portion 25 on gear 23, and a straight portion 56 corresponding to concentric portion 26 of said gear 23. A lever arm 57 is secured to or formed on hanger 31 and provided at its outer end with a roller 58 which is adapted to engage portions 54, 55 and 56 of support 50 for bringing idler gear 45 into mesh with the various portions of helical gear 23 as the roller 58 progresses along the portions 54, 55 and 56 of the support.

An arm 61 is hingedly mounted on lever arm 57 by means of a pin or bolt 62 and has a feed-nut 63 formed on its outer end and adapted to engage the threads 64 in sleeve 17. Lever arm 57 is raised by swinging support 50 on trunnions 51 and 52 by means of a lever 67, mounted on a shaft 68 extending between frame members 10 and 11, which has a crank 69 formed on its lower end and connected to one end of a link 70 whose other end is connected to a lug 71 secured near the lower edge of support 50, as shown in Figure 5.

When the free end of lever 67 is swung upwardly from the position shown in Figure 5, support 50 will be rocked on trunnions 51 and 52 into a horizontal plane, at which time, a rib 72, former along the lower edge of support 50, will engage the underside of arm 61 and raise feed-nut 63 out of engagement with threads 64. Trunnions 51 and 52 are so disposed relatively to straight portion 54 that, when support 50 is in a horizontal position, roller 58 will be disposed in a lower plane and allow spring 48 to swing gear 45 out of engagement with gear 23.

Assuming that the device is in inoperative position and shaft 15 being rotated from a suitable source of power, the device may be set into operation by swinging lever 67 into the position shown in Figure 5 which will cause the straight portion 54 of support 50 to engage roller 58 and elevate same sufficiently to bring idler gear 45 into mesh with concentric portion 24 of gear 23; support 50 being prevented from swinging beyond a certain point by a stop 73 fixed on frame member 11. At the same time, rib 72 will release arm 61 and allow feed-nut 63 to drop onto sleeve 17 so that it may engage threads 64 when they rotate into proper position.

Idler gear 45, being rotated by gear 16, will rotate helical gear 23 and, consequently, spur gear 21 which is in mesh with spur gear 22, thus causing rotation of sleeve 17. The pin or half-thread in feed-nut 63 will engage thread 64 and will be fed along sleeve 17, carrying hanger 31 and, consequently, roller 58 with it, causing the roller to ride up inclined portion 55 and maintain gear 45 in mesh at all times with helical portion 25 of gear 23 until it reaches straight portion 56, where it holds gear 45 in mesh with concentric portion 26. Shaft 18 is now rotating at its highest speed.

If feed-nut 63 is provided with a single hardened steel pin, or a small roller on a pin, for engaging thread 64 in sleeve 17, thread 64 may terminate in an annular groove 74 in which the pin or roller may ride when roller 58 is on straight portion 56 of support 50 and idler gear 45 in mesh with concentric portion 26 of helical gear 23. If feed-nut 63 is provided with a part of a thread for engaging thread 64, groove 74 is widened enough to accommodate the part thread and the sleeve bearing in hanger 31 widened sufficiently to allow the hanger to ride over the groove or feed-nut 63 may be hinged on the opposite side of lever arm 57.

As hanger 31 moves quill 34 and idler gear 45 longitudinally of hollow shaft 33, collar 39 will compress spring 38. When it is desired to stop the device, lever 67 is actuated to tip support 50 into a horizontal plane so that rib 72 will raise feed-nut 63 out of thread 64 and spring 48 draw gear 45 out of mesh with gear 23, thus stopping rotation of shaft 18 and allowing spring 38 to return quill 34 and gear 45 to the position shown in the drawings.

It will be understood that the invention as hereinbefore disclosed may be changed within the spirit thereof in various particulars and I do not wish therefore to be limited to the specific construction herein shown except as I shall be limited by the appended claims.

I claim:

1. A speed changing device including a driving gear, a helical gear rotatable adjacent the driving gear, an idler gear meshing with the driving gear, means for moving the idler gear into and out of mesh with the helical gear, means for feeding the idler gear along the helical gear, and means for returning the idler gear to its starting position after it is disengaged from the helical gear.

2. A speed changing device including driving and driven shafts, a driving gear on the driving shaft, a helical gear on the driven shaft, hangers pivotally suspended concentric with the driving shaft, an idler shaft carried by the hangers, an idler gear on the idler shaft meshing with the driving gear, means for feeding the idler gear along the helical gear, and a single means for simultaneously causing the swinging of the idler gear into mesh and for connecting the feeding means with the driving shaft in driven relation thereto.

3. A speed changing device including driving and driven shafts, a driving gear on the driving shaft, a helical gear on the driven shaft, hangers pivotally suspended concentric with the driving shaft, an idler shaft carried by the hangers, an idler gear on the idler shaft meshing with the driving gear, a lever arm on one of the hangers, a support movably mounted adjacent the driving shaft and adapted to be brought into engagement with the lever arm for swinging the idler gear into mesh with the helical gear, an inclined surface on the support for holding the idler gear in mesh with the helical gear, and means for moving the idler gear along the spiral gear.

4. A speed changing device including driving and driven shafts, a helical gear on the driven shaft, a driving gear fixed on the driving shaft, a threaded sleeve rotatable on the driving shaft, a hanger suspended from the sleeve, a lever arm on the hanger, an arm hinged on the lever arm, a feed-nut on the arm adapted to engage the sleeve and feed the hanger longitudinally thereof, a second hanger suspended from the driving shaft, an idler shaft carried by the hangers, an idler gear on the idler shaft meshing with the driving gear and adapted to be moved longitudinally of the idler shaft by the movement of the hanger, means for bringing the idler gear into mesh with the helical gear, and means for rotating the sleeve when the helical gear is rotated.

5. A speed changing device including driving and driven shafts, a helical gear on the driven shaft, a driving gear fixed on the driving shaft, a threaded sleeve rotatable on the driving shaft, a hanger suspended from the sleeve, a lever arm on the hanger, an arm hinged on the lever arm, a feed-nut on the arm adapted to engage the sleeve and feed the hanger longitudinally thereof, a second hanger suspended from the driving shaft, an idler shaft carried by the hangers, an idler gear on the idler shaft meshing with the driving gear and adapted to be moved longitudinally of the idler shaft by the movement of the hanger, means for bringing the idler gear into mesh with the helical gear, means for rotating the sleeve when the helical gear is rotated, means for disengaging the feed-nut from the threaded sleeve, and means for returning the idler gear to its starting position.

6. In a speed changing device, having a driving gear, a helical gear, hangers pivotally suspended concentric with the axis of the driving gear, an idler shaft carried by the hangers, and an idler gear on the idler shaft meshing with the driving gear and movable longitudinally of the helical gear, means for moving the idler gear into mesh with the helical gear and holding it in mesh therewith including a lever arm fixed on one of the hangers, a support pivotally mounted adjacent the idler shaft, means for swinging the support to engage the lever arm and swing the idler gear into mesh with the helical gear, and an inclined surface on the support for supporting the lever arm and holding the idler gear in mesh with the helical gear as it moves longitudinally thereof and means for moving the idler gear longitudinally of the helical gear.

7. A speed changing device including driving and driven shafts, a helical gear on the driven shaft, a driving gear fixed for rotation with the driving shaft, a threaded sleeve rotatable on the driving shaft, a hanger suspended from the sleeve and movable thereon, a lever arm on the hanger, a feed nut hinged on the lever arm and engaging the sleeve for feeding the hanger longitudinally thereof, a second hanger suspended from the driving shaft, an idler shaft carried by the hangers, an idler gear on the idler shaft meshing with the driving gear and adapted to be moved longitudinally of the helical gear by the movement of the hanger on the sleeve, a support rockably mounted parallel with the driven shaft, means for rocking the support to raise the end of the lever arm and swing the idler gear into mesh with the helical gear, an inclined surface on the support, means for rotating the sleeve to cause the feed nut to force the hanger along the sleeve and the end of the lever arm along the inclined surface, and means for disengaging the idler gear from the helical gear.

8. A speed changing device including driving and driven shafts, a helical gear on the driven shaft, a driving gear fixed for rotation with the driving shaft, a threaded sleeve rotatable on the driving shaft, a hanger suspended from the sleeve and movable thereon, a lever arm on the hanger, a feed nut hinged on the lever arm and engaging the sleeve for feeding the hanger longitudinally thereof, a second hanger suspended from the driving shaft, an idler shaft carried by the hangers, an idler gear on the idler shaft meshing with the driving gear and adapted to be moved longitudinally of the helical gear by the movement of the hanger on the sleeve, a support rockably mounted parallel with the driven shaft, means for rocking the support to raise the end of the lever arm and swing the idler gear into mesh with the helical gear, an inclined surface on the support, means for rotating the sleeve to cause the feed nut to force the hanger along the sleeve and the end of the lever arm along the inclined surface, a spring tending to swing the idler gear out of mesh with the helical gear, and a rib on the support for disengaging the feed nut from the threaded sleeve when the support is swung to lower the lever arm.

9. In a speed changing device, having a helical gear, a driving shaft, a driving gear fixed for rotation with the driving shaft, a threaded sleeve rotatable on the driving shaft, an idler gear meshing with the driving gear, means for bringing the idler gear into and out of mesh with the helical gear, and means for feeding it along the helical gear; means for supporting the idler gear and for returning it to its starting position including a hanger suspended from the sleeve and slidable thereon, a quill shaft having one end fixed in the hanger and its other end supporting the idler gear which is fixed against movement longitudinally thereof, a second hanger suspended from the driving shaft, a hollow shaft slidably fitted in the quill shaft and having one end secured in the said second hanger, and a spring in the hollow shaft having one end fixed against movement relatively to the hollow shaft and its other end fixed against movement relatively to the quill shaft.

In testimony whereof I have signed my name to this specification.

PATRICK J. KILCULLEN.